(12) United States Patent
Feltrin

(10) Patent No.: US 12,145,401 B2
(45) Date of Patent: Nov. 19, 2024

(54) BICYCLE WHEEL RIM AND PROCESS FOR MANUFACTURING THE SAME

(71) Applicant: CAMPAGNOLO S.r.l., Vicenza (IT)

(72) Inventor: Mauri Feltrin, Nanto (IT)

(73) Assignee: CAMPAGNOLO S.r.l., Vicenza (IT)

( * ) Notice: Subject to any disclaimer, the term of this patent is extended or adjusted under 35 U.S.C. 154(b) by 418 days.

(21) Appl. No.: 17/487,075

(22) Filed: Sep. 28, 2021

(65) Prior Publication Data

US 2022/0105751 A1 Apr. 7, 2022

(30) Foreign Application Priority Data

Oct. 1, 2020 (IT) .................. 102020000023149

(51) Int. Cl.
| | |
|---|---|
| B60B 21/06 | (2006.01) |
| B29C 70/46 | (2006.01) |
| B29C 70/54 | (2006.01) |
| B29L 31/30 | (2006.01) |
| B60B 1/00 | (2006.01) |

(52) U.S. Cl.
CPC ............ *B60B 21/062* (2013.01); *B29C 70/46* (2013.01); *B29C 70/545* (2013.01); *B60B 1/003* (2013.01); *B60B 21/064* (2013.01); *B29L 2031/3091* (2013.01); *B60B 2310/204* (2013.01); *B60B 2310/226* (2013.01); *B60B 2360/341* (2013.01)

(58) Field of Classification Search
CPC ................ B60B 21/062; B60B 21/064; B60B 2360/341; B60B 1/003; B60B 5/02; B60B 2900/31; B60B 2900/711; B29L 2031/3091
See application file for complete search history.

(56) References Cited

U.S. PATENT DOCUMENTS

| | | | |
|---|---|---|---|
| 7,578,563 B2 | 8/2009 | Muraoka et al. | |
| 8,652,380 B2 * | 2/2014 | Lew | B60B 21/04 |
| | | | 156/193 |
| 10,315,461 B2 * | 6/2019 | Schiers | B60B 1/043 |
| 2012/0006470 A1 | 1/2012 | Lew et al. | |

(Continued)

FOREIGN PATENT DOCUMENTS

| | | | | |
|---|---|---|---|---|
| EP | 1328409 A1 | 7/2003 | | |
| EP | 2422959 A1 * | 2/2012 | ............... | B26F 1/24 |
| EP | 3470238 A1 | 4/2019 | | |

(Continued)

OTHER PUBLICATIONS

EP 2422959 A1 (Year: 2012).*

(Continued)

*Primary Examiner* — Scott A Browne
*Assistant Examiner* — Eva L Comino
(74) *Attorney, Agent, or Firm* — Steinfl + Bruno LLP

(57) ABSTRACT

A composite bicycle rim, and a process for manufacturing the rim, having a plurality of perforated spoke-attachment seats having spaced apart first and second areas of cut structural fibers. The second area has both end portions of cut structural fibers having a longitudinal dimension greater than the first area's cut structural fibers and continuous structural fibers. At least some of the end portions of the second area's cut structural fibers are mutually juxtaposed or interposed with respect to the second area's continuous structural fibers.

9 Claims, 10 Drawing Sheets

(56) References Cited

U.S. PATENT DOCUMENTS

2019/0168538 A1\* 6/2019 Feltrin .................... B60B 1/003
2021/0323347 A1\* 10/2021 Feltrin .................... B60B 21/06

FOREIGN PATENT DOCUMENTS

EP          3 495 158 A1    6/2019
WO       2011/095399 A1    8/2011

OTHER PUBLICATIONS

Italian Search Report and Written Opinion in Italian Application No. 102020000023149, Jun. 24, 2021 with English translation.
European Communication pursuant to Article 94(3) EPC for European Application No. 21165986.7 filed on Mar. 30, 2021 on behalf of Campagnolo S.R.L. Mail Date: May 31, 2023 6 pages.
Italian Search Report and Written Opinion in Italian Application No. 102020000008116, Apr. 16, 2020 with English translation.
Non-Final Office Action for U.S. Appl. No. 17/227,512, filed Apr. 12, 2021 on behalf of Campagnolo S.R.L. Mail Date: Jun. 14, 2023 22 pages.
Restriction Requirement for U.S. Appl. No. 17/227,512, filed Apr. 12, 2021 on behalf of Campagnolo S.R.L. Mail Date: Apr. 4, 2023 6 pages.

\* cited by examiner

BICYCLE WHEEL RIM AND PROCESS FOR MANUFACTURING THE SAME

CROSS REFERENCE TO RELATED APPLICATION(S)

This application claims the benefit of Italian Application No. 102020000023149, filed on Oct. 1, 2020, which is incorporated herein by reference as if fully set forth.

FIELD OF INVENTION

The invention relates to a rim for a bicycle wheel and a process for manufacturing the aforementioned rim.

BACKGROUND

Rims made of composite material are known. They are usually manufactured through molding of the composite material according to a variety of shapes in cross section.

Typically, in the case of composite material including thermosetting polymeric material a compression molding is carried out, whereas in the case of composite material including thermoplastic polymeric material an injection molding or a thermoforming is carried out.

A plurality of perforated spoke-attachment seats must be made in the rim before associating the rim with a hub to form a bicycle wheel.

The aforementioned perforated seats must be made in the positions required by the spoke pattern of the particular wheel, depending on the number of spokes, their distribution along the circumference of the rim, their position in the cross section of the rim, and the direction taken up by each spoke, for example by virtue of the radial or tangential attachment of the spoke to the hub and/or of the camber angle.

Patent application no. EP 2422959 to the Applicant and patent U.S. Ser. No. 10/315,461 disclose processes for manufacturing bicycle wheel rims made of composite material in which the plurality of perforated spoke-attachment seats is made before molding the composite material so that, after molding, bicycle wheel rims are obtained which are already provided with the aforementioned perforated seats. In particular, the perforated spoke-attachment seats are formed in the desired positions through a displacement of the structural fibers before molding the composite material.

In EP 2422959 such a displacement is carried out by using a non-cutting pointed tool, like for example an awl. Such a tool, once inserted in the composite material, causes a localized displacement of the structural fibers, without cutting or shearing or removing structural fibers (except possibly for a very limited number of structural fibers, in particular those structural fibers which are located right at the tip end of the tool).

In U.S. Ser. No. 10/315,461 all of the structural fibers provided at each of the perforated seats to be made are displaced (except eventually for the provision of a percentage of cut structural fibers equal, at most, to 10% of the total structural fibers arranged at each perforated seat).

In the solutions described in EP 2422959 and U.S. Ser. No. 10/315,461, the displacement of the structural fibers results, in the case of unidirectional fibers, in the presence of two areas comprising an amassment of continuous (i.e. not cut) structural fibers arranged at diametrically opposite areas with respect to the perforated seat and along a substantially transversal direction with respect to the longitudinal direction of the structural fibers. On the other hand, in the case of bi-directional fibers, the displacement of the weft structural fibers and warp structural fibers results in the presence of four areas comprising an amassment of continuous structural fibers at four areas spaced apart by about 90° around the perforated seat.

The Applicant has observed that a drawback of the solutions described in EP 2422959 and U.S. Ser. No. 10/315,461 is that, particularly in the case of unidirectional fibers, but also in the case of bi-directional fibers, because of the displacement of such fibers, areas in which there is only polymeric material are formed at opposite parts with respect to each perforated seat, these areas being spaced apart from the areas comprising an amassment of the fibers. Such areas with only polymeric material define, in the rim, structural weakened parts. In such areas it is also possible to have small parts without polymeric material, i.e. parts with air bubbles, with consequent further weakening of the rim.

Another drawback of the solutions described in EP 2422959 and U.S. Ser. No. 10/315,461 is linked to the fact that around the perforated seats the structural fibers are not fully stretched and in order to be able to work correctly they must first stretch out and become loaded. This results in a structural weakening of the rim, or at least in a delay in the response provided by the rim to the mechanical stresses which it is subjected to during tensioning of the spokes and during pedaling.

The technical problem at the basis of the invention is to make a rim made of composite material that can better and more quickly withstand the aforementioned mechanical stresses.

SUMMARY

The present invention relates to a bicycle wheel rim comprising a wall made of composite material having a plurality of perforated spoke-attachment seats, wherein at least one of said perforated seats is at least in part delimited by:
- a first area comprising end portions of a first plurality of cut structural fibers;
- a second area, circumferentially spaced apart from the first area, comprising both end portions of a second plurality of cut structural fibers having a longitudinal dimension greater than the longitudinal dimension of the structural fibers of the first plurality of cut structural fibers, and first portions of continuous structural fibers; and,
- some end portions of the structural fibers of said second plurality of cut structural fibers are in a condition of mutual juxtaposition or of mutual interposition with respect to said first portions of continuous structural fibers.

BRIEF DESCRIPTION OF THE DRAWINGS

Further features and advantages of the invention will become clearer from the description of a preferred embodiment thereof, made with reference to the attached drawings, in which.

DETAILED DESCRIPTION OF THE PREFERRED EMBODIMENTS

Figure 1:
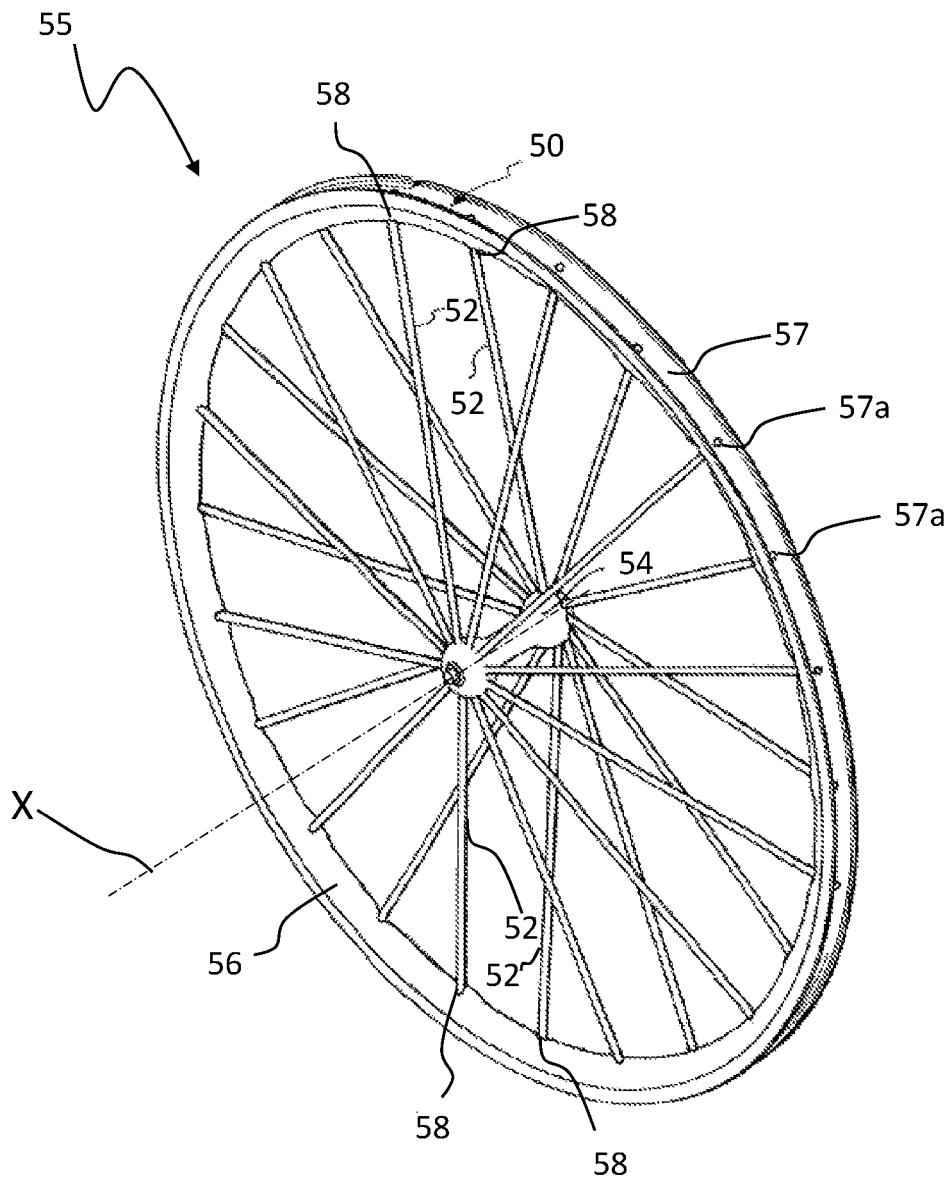
FIG. 1 is a bicycle wheel with a rim according to the present invention.

The rim of the invention comprises a composite material, at least in a wall thereof in which the perforated spoke-attachment seats are made. Hereinafter, such a rim will also be identified with the expression "rim made of composite material".

In the present description and in the attached claims, the term "perforated spoke-attachment seat" is used in a broad sense, to include both a seat in which a spoke is directly inserted, the spoke being for example provided with an enlarged head and/or with a threading, and a seat in which it is inserted a nipple or other element with which the spoke is associated.

In the present description and in the attached claims, the term "composite material" is used to indicate a material comprising a plurality of structural fibers incorporated in a polymeric material. Typically, the aforementioned structural fibers are unidirectional or bi-directional fibers. In the first case, a single layer of unidirectional fibers or at least two juxtaposed layers of unidirectional fibers inclined with respect to one another can be provided, with the structural fibers of each layer arranged so that, in areas of the rim far from the perforated spoke-attachment seats, they extend substantially parallel to one another along a respective longitudinal direction. In the second case, the composite material defines a fabric comprising a first plurality of substantially parallel structural fibers extending along the aforementioned first longitudinal direction (weft fibers) and a second plurality of substantially parallel structural fibers extending along a second direction substantially perpendicular to the aforementioned first direction (warp fibers).

Hereinafter, when reference is made to unidirectional fibers, the structural fibers of a layer of unidirectional fibers will be referred to.

In the present description and in the attached claims the following definitions apply.

The term "condition of mutual juxtaposition" is used to indicate both a relative position of the first portions of continuous structural fibers and of the end portions of the structural fibers of the second plurality of cut structural fibers such that the end portions of the structural fibers of the second plurality of cut structural fibers are radially juxtaposed over the first portions of continuous structural fibers, and a relative position of the first portions of continuous structural fibers and of the end portions of the structural fibers of the second plurality of cut structural fibers such that the first portions of continuous structural fibers are radially juxtaposed over the end portions of the structural fibers of the second plurality of cut structural fibers.

The term "condition of mutual interposition" is used to indicate a relative position of the first portions of continuous structural fibers and of the end portions of the structural fibers of the second plurality of cut structural fibers such that the end portions of the structural fibers of the second plurality of cut structural fibers are radially interposed between the first portions of continuous structural fibers and/or vice-versa.

The term "radially", when used with reference to the structural fibers, indicates a direction taken along any radius of a circumference that delimits the perforated spoke-attachment seat. Such a direction is also indicated as "radial direction".

The expression "radially outer", when used with reference to the structural fibers, indicates a radial direction oriented from the center of the aforementioned circumference towards the outside of such a circumference.

The expression "radially inner", when used with reference to the structural fibers, indicates a radial direction oriented from the outside of the aforementioned circumference towards the center of such a circumference.

The term "circumferentially", when used with reference to the structural fibers, indicates a direction taken along a circumference that delimits the perforated spoke-attachment seat.

Advantageously, the rim of the invention is capable of responding to the mechanical stresses which it is subjected to during use more quickly and efficiently than the rims described in EP 2422959 and U.S. Ser. No. 10/315,461. This is due to the provision of portions of structural fibers in all of the areas around each perforated seat, and thus also in those areas in which, in the rims described in EP 2422959 and U.S. Ser. No. 10/315,461, the fibers have been displaced leaving only polymeric material there.

In particular, thanks to the mutual juxtaposition or interposition of end portions of cut structural fibers and of portions of continuous structural fibers, once the composite material is cross-linked after molding, the end portions of the cut structural fibers are constrained to the continuous structural fibers, thus contributing to the structural strength of the rim at the perforated spoke-attachment seats.

In practice, the rim of the invention has, around the perforated spoke-attachment seats, areas of amassment of end portions of cut structural fibers and of portions of continuous structural fibers. Such areas of amassment of fibers allow the rim to effectively withstand and transfer the stresses which it is subjected to at the perforated spoke-attachment seats. In particular, at the aforementioned areas of amassment of fibers a gradual and continuous transfer of the mechanical stresses from the end portions of the cut structural fibers to the continuous structural fibers occurs, to the benefit of the structural strength of the rim.

In the present description and in the attached claims, the term "area of amassment of structural fibers" is used to indicate an area in which the local density of the structural fibers is greater than an average nominal density of the structural fibers in the composite material. Therefore, if the composite material has a certain average nominal density of structural fibers, it will have, in every area of the wall of the rim far from the perforated spoke-attachment seats, a density of structural fibers in a tolerance range around the average nominal density and, in the area of amassment of structural fibers, a density of structural fibers greater than the upper limit of such a tolerance range. The area of amassment of structural fibers is obtained while the spoke-attachment seats are being made before molding the composite material, i.e. before the latter is cross-linked. In such circumstances, indeed, the structural fibers are capable of displacing with respect to the polymeric material because of the thrusting action exerted on them by the tool used to make the perforated spoke-attachment seats.

Preferably, the structural fibers provided in said at least one first area are only those of said first plurality of cut structural fibers. Such structural fibers occupy those areas in which in the rims described in EP 2422959 and U.S. Ser. No. 10/315,461 the structural fibers have been displaced leaving only polymeric material there, to the benefit of the structural strength of the rim at such areas.

In a first embodiment of the rim of the invention, said at least one second area comprises at least one first zone in which both said end portions of said second plurality of cut structural fibers and said first portions of continuous structural fibers are provided and at least one second zone in which only second portions of said continuous structural fibers are provided.

In this case, preferably, said at least one first zone is circumferentially interposed between said at least one first area and said at least one second zone.

In a second embodiment of the rim of the invention, only said end portions of said second plurality of cut structural fibers and said first portions of continuous structural fibers are provided in said at least one second area. In this case, therefore, around the perforated spoke-attachment seat there are no areas in which only portions of continuous structural fibers are provided.

In some embodiments of the rim of the invention, at least some of said end portions of said second plurality of cut structural fibers are at least partially arranged in a radially outer position with respect to said first portions of continuous structural fibers.

In other embodiments of the rim of the invention, at least some of said end portions of said second plurality of cut structural fibers are at least partially arranged in a radially inner position with respect to said first portions of continuous structural fibers.

In further embodiments of the rim of the invention, at least some of said end portions of said second plurality of cut structural fibers are in part arranged in a radially inner position with respect to said first portions of continuous structural fibers and in part arranged in a radially outer position with respect to said first portions of continuous structural fibers.

In this last case, preferably, the portions of cut structural fibers arranged in a radially inner position are adjacent to a first area and the portions of cut structural fibers arranged in a radially outer position are arranged on the opposite side to said first area with respect to the aforementioned portions of cut structural fibers arranged in a radially inner position.

Preferably, at least some of said end portions of said second plurality of cut structural fibers are grouped together to form respective strands of cut structural fibers. Advantageously, at such strands there is an amassment of cut structural fibers that produces an increase of the contribution provided by the end portions of cut structural fibers to the structural strength of the rim.

In preferred embodiments of the rim of the invention, said at least one perforated seat is at least in part delimited by two of said first areas and by two of said second areas.

Preferably, said two second areas are arranged at first angular sectors that are opposite with respect to said at least one perforated seat.

In the present description and in the attached claims, the term "angular sector" is used to indicate an angular portion of the circumference that delimits the perforated spoke-attachment seat, such an angular portion having an angle to the center lower than 180°, preferably lower than or equal to 90°.

The first angular sectors can be opposite with respect to a diametral plane of the perforated seat, but not aligned along a specific direction.

Preferably, the first angular sectors are diametrically opposite, i.e. opposite with respect to a diametral plane of the perforated seat and aligned along a radial direction.

Preferably, said two first areas are arranged at second angular sectors that are opposite with respect to said at least one perforated seat.

The second angular sectors can be opposite with respect to a diametral plane of the perforated seat, but not aligned along a specific direction.

Preferably, the second angular sectors are diametrically opposite, i.e. opposite with respect to a diametral plane of the perforated seat and aligned along a radial direction.

Preferably, said two first areas are arranged along a first direction.

Preferably, the first direction is substantially parallel to a longitudinal direction of the continuous and cut structural fibers in areas far from the perforated seats.

Preferably, said two second areas are arranged along a second direction inclined with respect to the first direction by a first angle.

Preferably, the second direction is substantially perpendicular to the first direction.

In some embodiments of the rim of the invention, and in particular in the case in which at least two second areas are provided, each of them comprising said at least one first zone and said at least one second zone, two of said first zones are arranged on opposite sides with respect to a diametral plane of the perforated seat.

In some cases, the aforementioned two first zones are arranged on diametrically opposite sides with respect to a diametral plane of the perforated seat, i.e. they are arranged along a single radial direction. In this case, said two first zones are aligned along a third direction that, preferably, is inclined with respect to the first direction by a second angle lower than said first angle.

In the cases described above, preferably, two of said second zones are arranged on opposite sides with respect to the perforated seat along said second direction.

Preferably, in areas far from the perforated seats the structural fibers of said first plurality of cut structural fibers and second plurality of cut structural fibers occupy a space having, along a direction perpendicular to said longitudinal direction, a size greater than 10% of the diameter of the perforated seats. More preferably, said size is comprised between 20% and 70% of the diameter of the perforated seats, the extreme values being included. In particular, the aforementioned size is preferably comprised between 20% and 50% of the aforementioned diameter, the extreme values being included.

In a second aspect thereof, the present invention relates to a process for manufacturing a bicycle wheel rim, comprising:

arranging a composite material in a mold comprising a radially outer wall provided with a plurality of first through holes;

perforating, through a cutting tool, the composite material at said plurality of said first through holes making a plurality of second through holes in the composite material;

inserting respective non cutting pointed tools in said first through holes and second through holes on the radially inner side of the mold along respective insertion directions until a tip of each of said non cutting pointed tools projects in a radially outer direction with respect to said composite material;

compacting the composite material at each of said second through holes by pressing the composite material against said radially outer wall through a pressing tool;

removing said non cutting pointed tools from said first through holes moving each non cutting pointed tool along a direction opposite to the respective insertion direction;

molding the composite material in the mold, obtaining a respective perforated spoke-attachment seat at each of said second through holes;

wherein at least one of said perforated seats is at least in part delimited by:

at least one first area comprising end portions of a first plurality of cut structural fibers;

at least one second area circumferentially spaced apart from said at least one first area and comprising both end portions of a second plurality of cut structural fibers having a longitudinal dimension greater than that of the structural fibers of said first plurality of cut structural fibers, and first portions of continuous structural fibers;

wherein at least some of the end portions of the structural fibers of said second plurality of cut structural fibers are in a condition of mutual juxtaposition or of mutual interposition with respect to said first portions of continuous structural fibers.

In the present description and in the attached claims, the term:

"cutting tool" is used to indicate a rotating tool having at least one cutting edge, like for example a drill bit;

"perforate" is used to indicate a mechanical operation that causes the cutting of continuous structural fibers.

The aforementioned process can be carried out to make a bicycle wheel rim according to the first aspect of the invention. Therefore, such a process makes it possible to achieve the advantages described above with reference to the rim of the invention.

In particular, compacting the composite material at each of said second through holes makes it possible to obtain the desired condition of mutual juxtaposition or of mutual interposition of the end portions of cut structural fibers and of the first portions of continuous structural fibers, to the benefit of the structural strength of the rim.

Preferably, said tip is heated. Such a provision makes it possible to increase the capability and speed of displacement of the structural fibers encountered by the non-cutting pointed tool during the movement thereof in the second through hole.

Preferably, compacting the composite material comprises:
fitting a respective insert onto each of said tips;
pressing the composite material against said radially outer wall acting with said pressing tool on said insert.

The aforementioned tip thus acts as a reference and a guide for the application and correct positioning of the respective insert on the rim being made.

Thereafter, the insert is co-molded together with the composite material, so as to achieve an increase in the structural strength of the rim at the perforated spoke-attachment seats, as well as a more homogeneous distribution of the stresses which the rim is subjected to at such perforated seats. Moreover, the co-molding of the inserts prevents a friction wear due to the sliding of the insert on the composite material.

Preferably, said pressing tool comprises a first end portion having a top surface configured to be hit with a hammer.

Preferably, the pressing tool comprises a second end portion having a hollow cylindrical shape.

Preferably, pressing the composite material against said radially outer wall comprises fitting said second end portion onto the tip of each non cutting pointed tool until said second end portion abuts against the respective insert. The aforementioned tip thus acts as a reference and a guide for the pressing tool, thereby facilitating the correct positioning of the second end portion of the pressing tool on the respective insert and, consequently, the application of the insert on the rim being made.

Preferably, perforating the composite material comprises, at each of said first through holes, inserting the cutting tool in the first through hole along said insertion direction from a radially inner side of the mold.

Preferably, perforating the composite material comprises, after the aforementioned insertion, pushing the cutting tool along said insertion direction until the respective second through hole is made in the composite material.

Advantageously, the second through holes are made at the first through holes of the mold.

The movement of the cutting tool is thus guided by the aforementioned first through holes. In other words, the first through holes of the mold unequivocally define the position and the direction of the perforated seat, making the perforating operation extremely quick and precise.

Preferably, said mold has a substantially annular shape and comprises, on a radially inner surface thereof, a circumferential groove connected to said first through holes.

Preferably, the process according to the invention comprises, after having arranged the composite material in the mold and before perforating the composite material to make each second through hole, inserting the cutting tool in the circumferential groove and moving the cutting tool along the circumferential groove until the respective first through hole is reached. The cutting tool is therefore easily guided between the first through holes through the circumferential groove. Such a provision contributes to make the perforating operation quick and precise.

Preferably, perforating the composite material comprises, after having pushed the cutting tool along said first direction, removing the cutting tool from said second through hole by moving it along a second direction opposite to said first direction.

Preferably, the cutting tool comprises a cylindrical cutting portion and a conical cutting tip.

Advantageously, the conical sharp tip makes it possible to precisely start the perforation, whereas the cylindrical cutting portion defines the diameter of the second hole, calibrating it to the desired size.

Preferably, said cylindrical cutting portion has a diameter comprised between 20% and 100% of the diameter of the second through holes, more preferably between 20% and 70% of the diameter of the second through holes.

The Applicant has observed that also in the case in which the diameter of the cylindrical cutting portion is equal to that of the second through holes a percentage of structural fibers are not cut (uncut) but displaced. Such displacement, caused initially by the conical cutting tip and subsequently by the cylindrical cutting portion, is made possible by the fact that the cutting tool works on a polymeric material that is not yet cross-linked, and thus capable of allowing a displacement of the structural fibers contained therein.

According to a preferred embodiment of the process of the invention, said conical cutting tip is diamond-tipped.

Advantageously, the diamond-tipped tip has significant properties as to the cutting reliability and durability.

Preferably, each of said non cutting pointed tools comprises a cylindrical portion and a conical non cutting tip.

Preferably, said cylindrical portion has a diameter comprised between 90% and 100% of the diameter of the second through holes, preferably between 95% and 100% of the diameter of the second through holes, even more preferably between 97% and 100% of the diameter of the second through holes, for example equal to 98% of the diameter of the second through holes.

With initial reference to FIG. 1, a bicycle wheel rim according to the present invention is indicated as a whole with 50. The bicycle wheel is indicated with 55.

The rim 50 is made, at least partially, of composite material 6.

The structural fibers of the composite material 6 are preferably selected from the group consisting of carbon fibers, glass fibers, boron fibers, aramid fibers, ceramic fibers and combinations thereof, wherein carbon fiber is preferred.

The polymeric material of the composite material 6 can be thermoplastic or thermosetting. Preferably, such a polymeric material is a thermosetting resin.

The mechanical characteristics of the composite material 6 can vary as a function of the type of structural fiber, of the type of weaving/arrangement thereof, of the type of polymeric material and of the percentage ratio between structural fiber and polymeric material.

Figure 3:
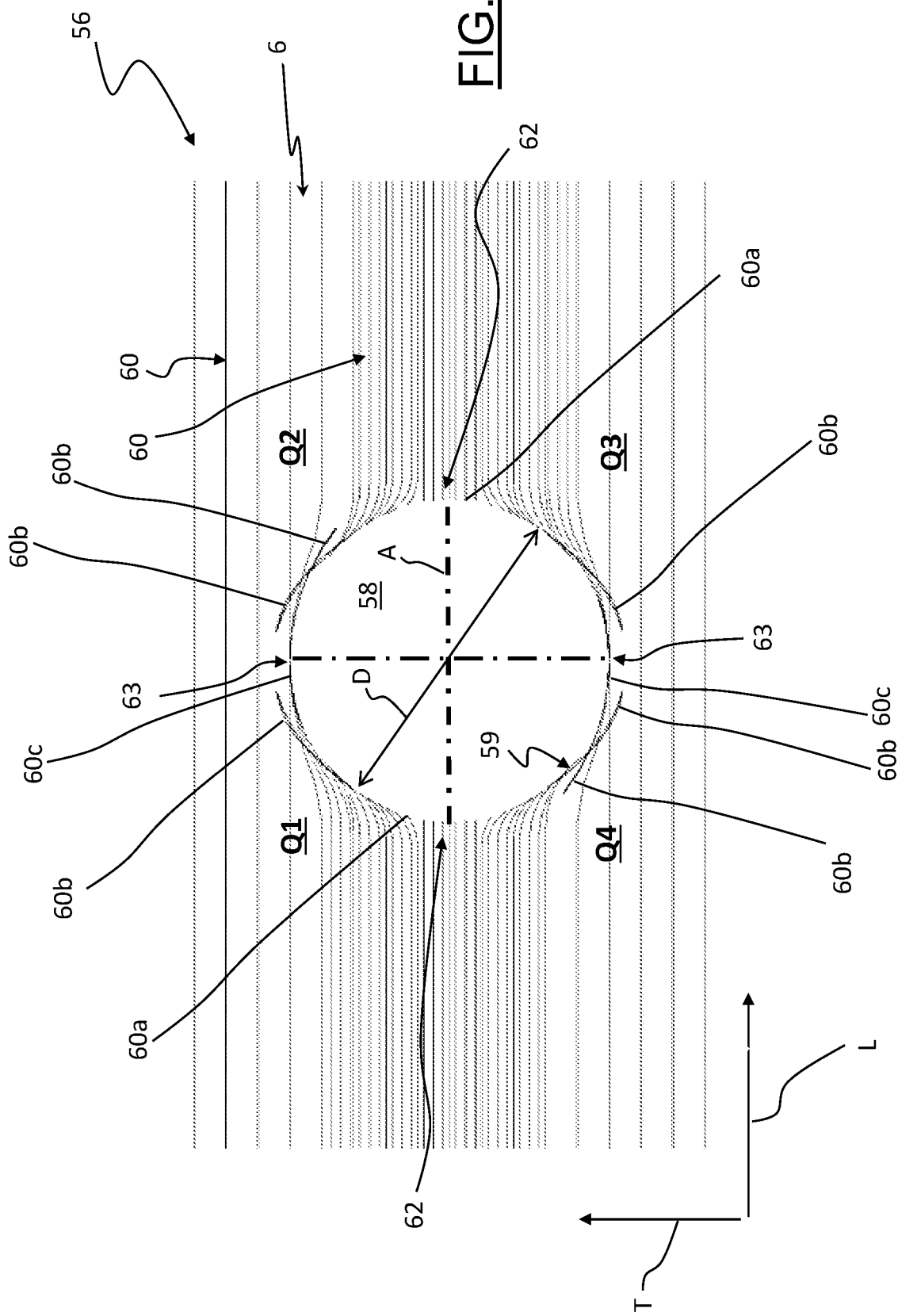
FIG. 3 is a plan view of a portion of the composite material provided in a first preferred embodiment of the rim according to the present invention.
Figure 4:
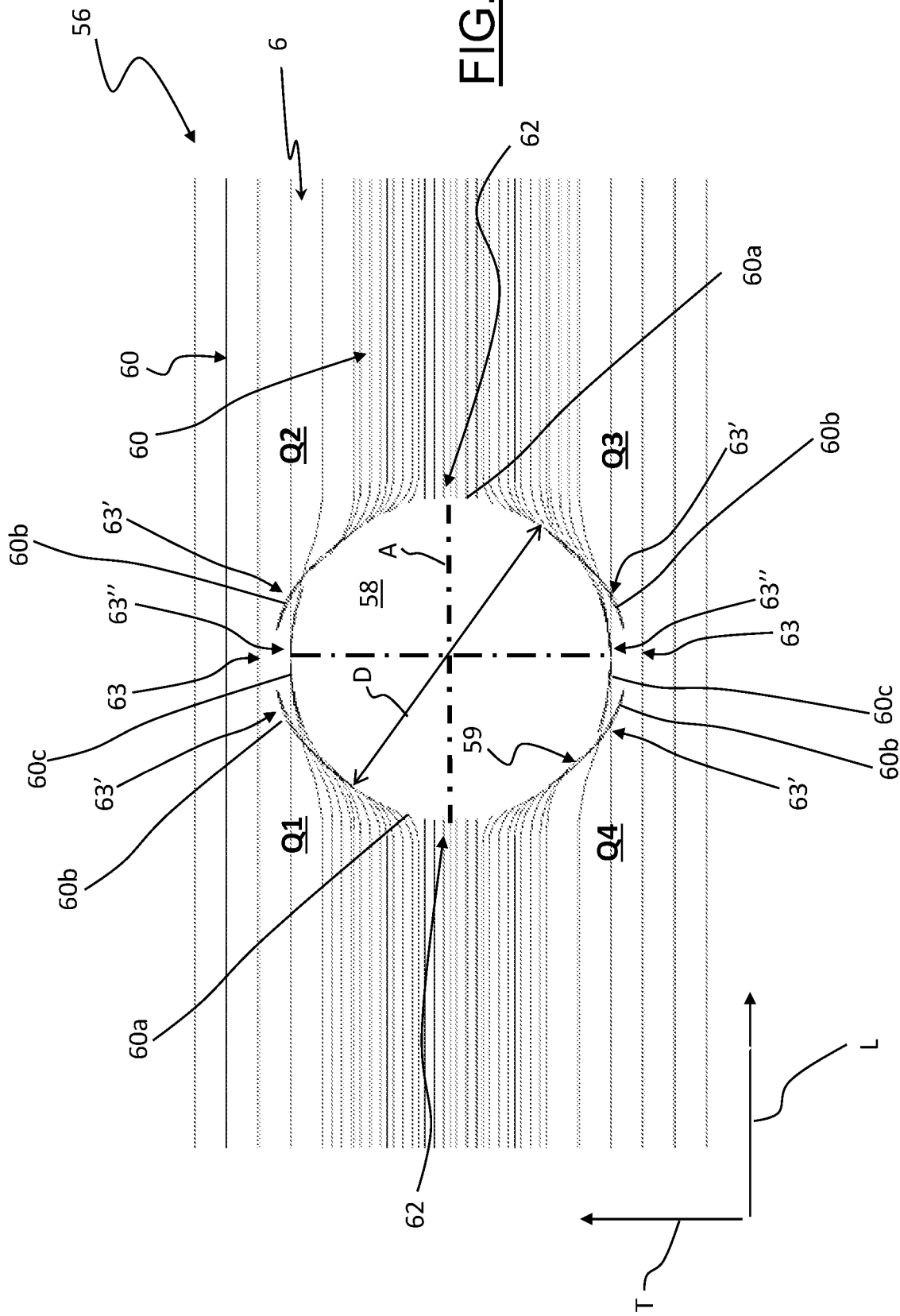
FIG. 4 is a plan view of a portion of the composite material provided in a second preferred embodiment of the rim according to the present invention.

In the non-limiting cases illustrated in FIGS. 3 and 4, the structural fibers of the composite material 6 are unidirectional fibers.

FIGS. 3 and 4 each illustrate a portion of a layer of unidirectional structural fibers 60. The structural fibers of the composite material 6 can also be arranged in many juxtaposed layers.

In FIGS. 3 and 4 the unidirectional structural fibers 60 extend substantially parallel to one another along a longitudinal direction L, which can be parallel or inclined with respect to the circumferential direction of the rim 50.

Preferably, many juxtaposed layers of unidirectional fibers are provided, said layers being arranged so that the directions of the unidirectional fibers of two adjacent layers form angles of opposite sign, and preferably of +45° and −45°, with the circumferential direction of the rim 50.

The rim 50 has a predetermined rotation axis X and is mounted on a hub 54 of the bicycle wheel 55 through a plurality of spokes 52.

The rim 50 has a radially inner annular wall 56 made of composite material. A plurality of perforated spoke-attachment seats 58, preferably having a substantially circular shape and where the spokes 52 are mounted, is made on such an annular wall 56.

The rim 50 has a radially outer annular wall 57 having a plurality of through holes 57a, each at a respective perforated seat 58.

In the non-limiting example of FIG. 1 the annular wall 56 has a symmetrical shape with respect to the rotation axis X and to a diametral middle plane perpendicular to the rotation axis X, and the spokes 52 extend along substantially radial directions. However, alternative embodiments are provided in which the annular wall 56 has a non-symmetrical shape and/or where the spokes 52 extend along directions inclined with respect to the radial direction.

In the present description and in the attached claims, the terms "inner" and "outer" refer to the radial direction of the rim 50 or, in some contexts, they can refer to the direction taken up by a spoke 52. In any case the aforementioned terms are used to indicate positions which are proximal and distal, respectively, with respect to the rotation axis X of the rim 50.

Figure 2:
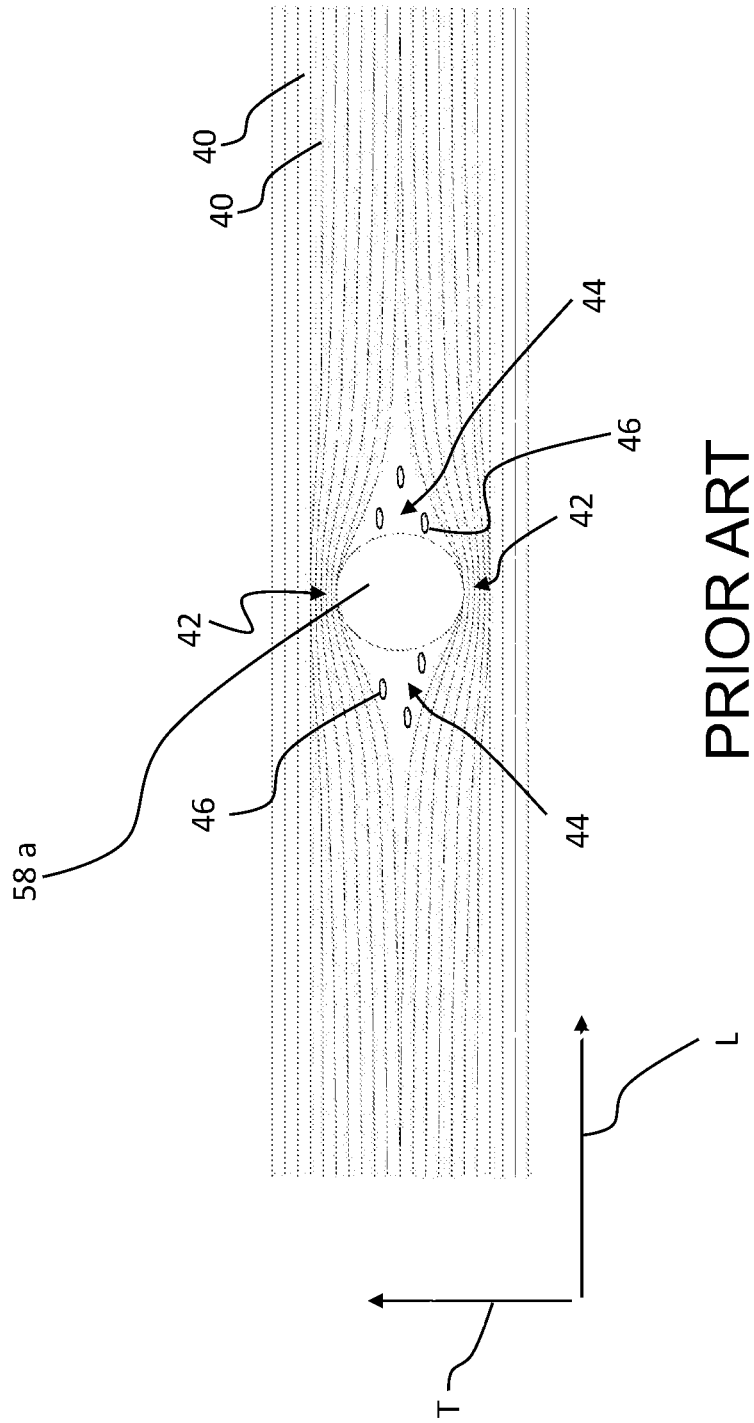
FIG. 2 is a plan view of a portion of the composite material provided in a prior art rim.

FIG. 2 shows, schematically and as an example, the progression of the unidirectional fibers close to a perforated spoke-attachment seat 58a of a bicycle wheel rim according to a prior art analogous to that of the aforementioned documents EP 2422959 and U.S. Ser. No. 10/315,461. The perforated seat 58a is formed, before the molding of the composite material, through displacement of unidirectional structural fibers 40.

In particular, it is noted the presence of two areas 42 of amassment of continuous unidirectional structural fibers 40. The two areas 42 are arranged at diametrically opposite parts with respect to the perforated seat 58a and along a transversal direction T that is substantially perpendicular to the longitudinal direction L of the unidirectional structural fibers 40 in areas far from the perforated seats 58a.

It is also noted the presence of two areas 44 in which only polymeric material is provided and in which there are small zones 46 without polymeric material. The areas 44 are arranged at opposite parts with respect to each perforated seat 58a and spaced apart from the areas 42 of amassment of the fibers 40 by about 90°.

FIGS. 3 and 4 illustrate, schematically and as an example, the progression of the structural fibers close to a perforated seat 58 of the annular wall 56 of two preferred embodiments of the rim 50.

In the non-limiting examples of FIGS. 3 and 4, the composite material comprises unidirectional structural fibers 60 that, in areas far from the perforated seats 58, extend along a longitudinal direction L. The longitudinal direction L can be parallel to the circumferential direction of the rim 50 or inclined with respect to the circumferential direction of the rim 50, for example by about 45° or by about 60°.

Each perforated seat 58 has a substantially circumferential shape and is delimited, along the entire perimeter circumference 59 thereof, by continuous unidirectional structural fibers 60 and by cut unidirectional structural fibers 60.

In particular, in the first preferred embodiment of the rim 50 illustrated in FIG. 3, one or some or each of such perforated seats 58 are delimited by two first areas 62 comprising end portions of cut structural fibers 60a and by two second areas 63 comprising both end portions of cut structural fibers 60b and portions of continuous structural fibers 60c.

The cut structural fibers 60b have a longitudinal dimension greater than that of the cut structural fibers 60a and can be either in a condition of mutual juxtaposition with respect to the portions of continuous structural fibers 60c or in a condition of mutual interposition with respect to the portions of continuous structural fibers 60c.

In particular, at least some of the end portions of cut structural fibers 60b can be arranged in a radially outer position with respect to the portions of continuous structural fibers 60c, or in a radially inner position with respect to the portions of continuous structural fibers 60c, or in part in a radially outer position with respect to the portions of continuous structural fibers 60c and in part in a radially inner position with respect to the portions of continuous structural fibers 60c, or they can be interposed between the portions of continuous structural fibers 60c.

In general, at least some of the end portions of cut structural fibers 60b can have parts arranged in a radially inner position and/or in a radially outer position and/or in interposed with respect to the portions of continuous structural fibers 60c.

Moreover, at least some of the end portions of cut structural fibers 60b can be grouped together to form respective strands of cut structural fibers.

In the non-limiting example of FIG. 3, the structural fibers provided in the first areas 62 are only those of the first plurality of cut structural fibers 60a, whereas in the second areas 63 only the end portions of cut structural fibers 60b and the portions of continuous structural fibers 60c are provided. Therefore, there are no parts of the perimeter circumference 59 of the perforated seat 58 at which only portions of continuous structural fibers 60c are provided.

In particular, with reference to FIG. 3, in the top right and bottom left around the perforated seat 58 there are two end portions of cut structural fibers 60b that cross the entire second area 63 at the top (proceeding from left to right) and the entire second area 63 at the bottom (proceeding from right to left), respectively. In other words, by drawing in FIG. 3 two perpendicular diametral planes extending along the longitudinal direction L and along a transversal direction T perpendicular to the longitudinal direction L, respectively, and identifying, through the aforementioned diametral planes, four angular sectors around the perforated seat 58 at respective quadrants indicated with Q1-Q4 moving in the clockwise direction from the one in the top left, two end portions of cut structural fibers 60b cross the entire second area 63 at the top proceeding from the quadrant Q1 up to the quadrant Q2 and other two end portions of cut structural fibers 60b cross the entire second area 63 at the bottom proceeding from the quadrant Q3 up to the quadrant Q4.

The second areas 63 are circumferentially spaced apart from the first areas 62.

In the non-limiting example shown in FIG. 3, the two first areas 62 are arranged on diametrically opposite sides with respect to the perforated seat 58 along the longitudinal direction L and the two second areas 63 are arranged on diametrically opposite sides with respect to the perforated seat 58 along the transversal direction T. Therefore, the two first areas 62 are diametrically opposite and spaced apart by about 90° with respect to the two second areas 63.

As illustrated in FIG. 3, the longitudinal direction L is substantially parallel to a longitudinal direction of the continuous structural fibers 60c and of cut structural fibers 60a, 60b in areas far from the perforated seat 58.

It is also noted that some of the cut structural fibers 60a of the first areas 62 have, close to the perforated seat 58, a curvilinear shape, whereas in areas far from the perforated seat 58 they have a substantially rectilinear shape and are parallel to the longitudinal direction L. Close to the perimeter circumference 59 of the perforated seat 58, the cut structural fibers 60a tend to open with respect to a diametral plane A of the perforated seat 58 parallel to the longitudinal direction L, i.e. to take up inclinations with respect to the longitudinal direction L that are progressively greater as the second areas 63 and, therefore, the perforated seat 58, are approached. Similarly, some of the cut structural fibers 60b of the second areas 63 also open with respect to the diametral plane A of the perforated seat 58.

In areas far from the perforated seats 58 the cut structural fibers 60a and 60b occupy a space having, along the transversal direction T, a size greater than 10% of the diameter D of the perforated seats 58. Preferably, such a size is comprised between 20% and 70% of the diameter D of the perforated seats 58, the extreme values being included, more preferably between 20% and 50% of the diameter D.

FIG. 4 shows a second embodiment of the rim 50 according to the invention, which differs from the embodiment of FIG. 3 only for the type of structural fibers provided in the second areas 63.

In particular, in the embodiment of FIG. 4 each of the two areas 63 comprises a first zone 63' in which both end portions of cut structural fibers 60b and first portions of the continuous structural fibers 60c are provided and a second zone 63" in which only second portions of the continuous structural fibers 60c are provided.

The first zone 63' is circumferentially interposed between a first area 62 and the second zone 63".

The two first zones 63' of the two second areas 63 are arranged on diametrically opposite sides with respect to the perforated seat 58 along a direction inclined with respect to the longitudinal direction L by an angle smaller than 90°, preferably comprised between 15° and 45°.

The two second zones 63" of the two second areas 63 are arranged on diametrically opposite sides with respect to the perforated seat 58 along the transversal direction T.

In the non-limiting example of FIG. 4, both in the quadrants Q1 and Q2 and in the quadrants Q3 and Q4 there are two first zones 63' and a second zone 63". Therefore, unlike the embodiment of FIG. 3, there are no end portions of cut structural fibers 60b that cross the second areas 63.

Further embodiments are provided for in which for example a first zone 63' is provided in the quadrant Q1 (and/or in the quadrant Q3) and a second zone 63" is provided in the quadrant Q2 (and/or in the quadrant Q4).

With reference to FIGS. 5-10, a preferred embodiment of the process for manufacturing a bicycle wheel rim according to the invention, like for example the rim 50 described above, is described.

The process comprises molding the composite material in a mold 70.

The mold 70 has a substantially annular shape and comprises two annular elements 1, 2 coupled together to define a mold cavity 3.

In the embodiment shown in the attached figures, the mold cavity 3 is shaped to make a symmetrical rim 50, in particular for tubeless tyres.

The annular elements 1, 2, when coupled, define a plurality of through holes 5 at which the perforated seats 58 will be made.

Figure 6:
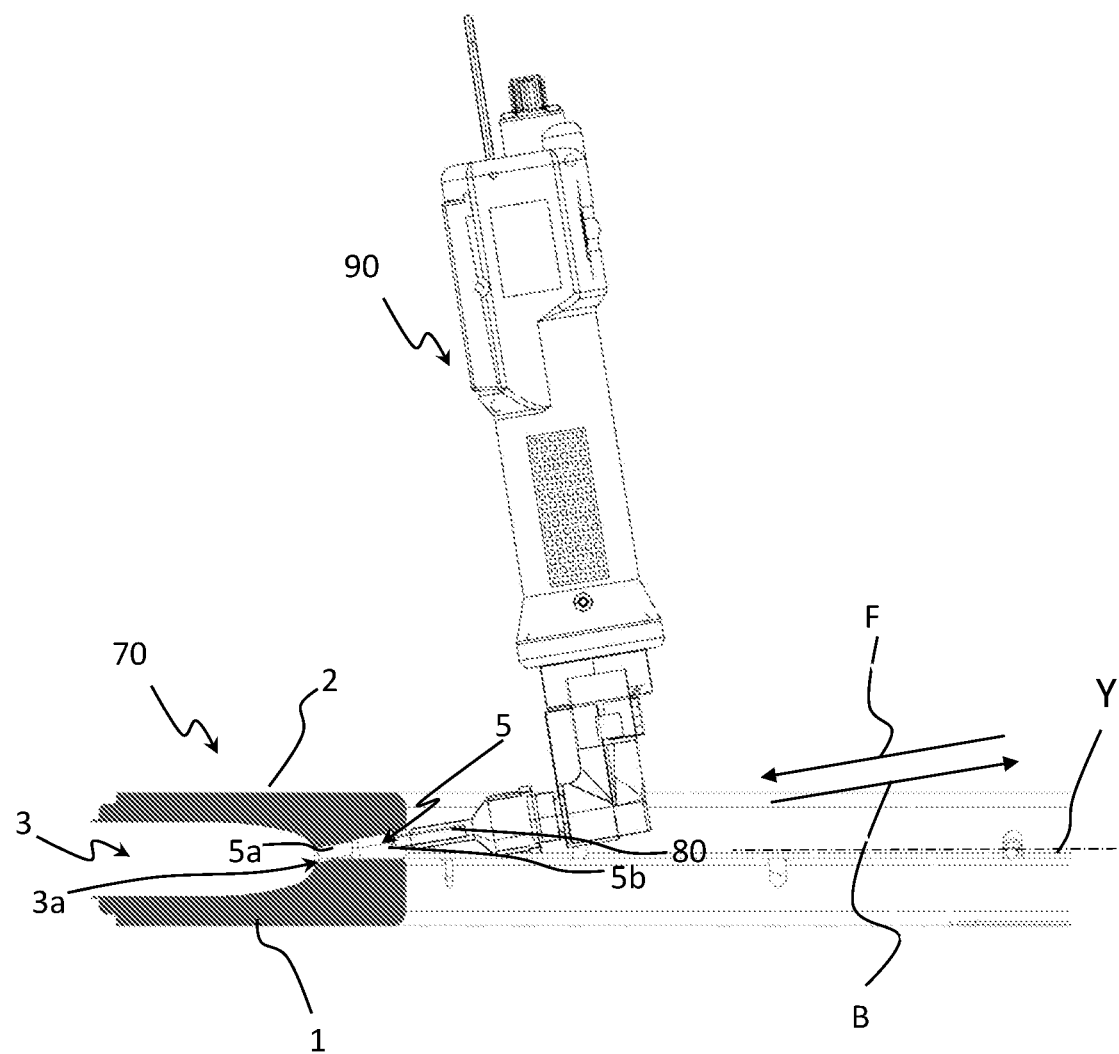
FIG. 6 is a partially section of the manufacturing step looking in the direction of 6-6 in FIG. 5.

FIG. 6 shows a right half-section of the mold 70 taken at a through hole 5.

In the embodiment shown in the attached figures, the through hole 5 is made in part in the annular element 1 and in part in the annular element 2 and comprises a substantially cylindrical radially outer portion 5a and a radially inner portion 5b having a substantially frusto-conical shape flared inwardly, or a cylindrical shape.

The radially outer portion 5a has a diameter substantially equal to the nominal diameter D of the perforated spoke-attachment seats 58, or slightly greater than the nominal diameter D.

The radially outer portion 5a extends along a direction that corresponds to the direction along which the spoke 52 housed in the perforated seat 58 of the rim 50 will extend.

Figure 5:
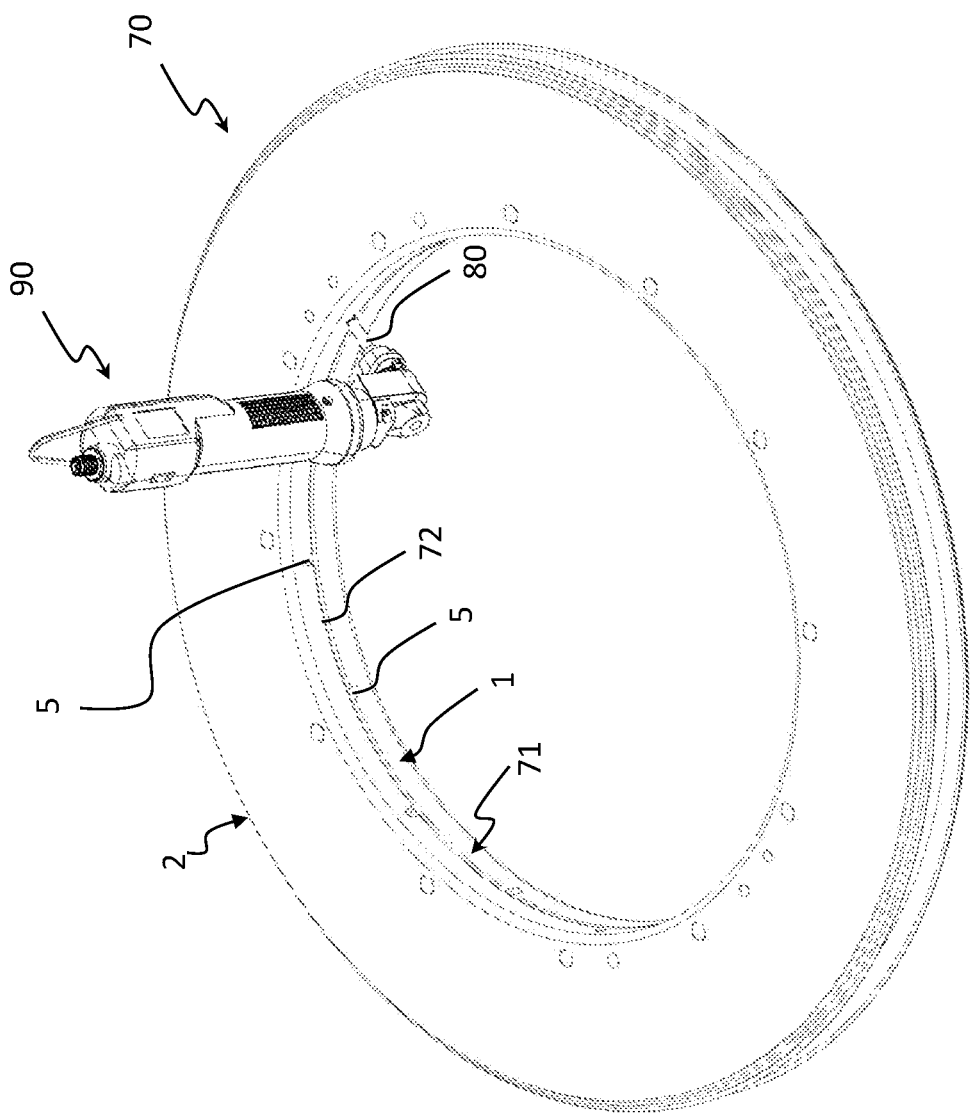
FIG. 5 illustrates a first manufacturing step for a bicycle rim according to the process of the present invention.

In the case illustrated in the attached figures, such a direction extends in the plane of FIG. 5, that is in a transversal plane of the rim 50, along a direction inclined with respect to the diametral middle plane Y of the mold 70.

The corresponding spoke 52 is therefore of the type configured for a radial attachment to the hub 54 with a certain camber. Those skilled in the art will understand that other through holes 5 are provided in suitable positions along the circumferential direction of the annular elements 1, 2, with suitable inclination of the relative radially outer portions 5a depending on the desired camber.

Since in certain spoke arrangements the perforated seats 58 in the rim 50 may not be aligned along a single middle plane of the rim 50 and/or the spokes 52 may have a tangential or in any case non-radial attachment to the hub 54, the through holes 5 in the annular elements 1, 2 will have suitable directions and positions and some through holes 5 could also extend in only one of the annular elements 1, 2.

The annular elements 1, 2 preferably have abutment members (not shown) like for example pins and centering holes, reference marks and similar, to ensure that when they are coupled together, the two parts of each through hole 5 in the two annular elements 1, 2 are correctly aligned to wholly define the through hole 5 itself.

The mold 70 comprises, on a radially inner surface 71 thereof, a circumferential groove 72 connected to the through holes 5.

The process according to the invention initially comprises arranging the composite material 6 in the mold 70, in particular on a radially outer wall 3a of the mold cavity 3.

More in particular, the mold cavity 3 is coated with one or more layers of sheeted composite material 6, preferably preimpregnated. Such materials are in general known in the field as Sheet Moulding Compounds (SMC) or "prepreg", and comprise substantially structural fibers preimpregnated with polymeric material.

The arrangement of the composite material 6 in the mold cavity 3 can take place by hand or be automated.

Figure 7:
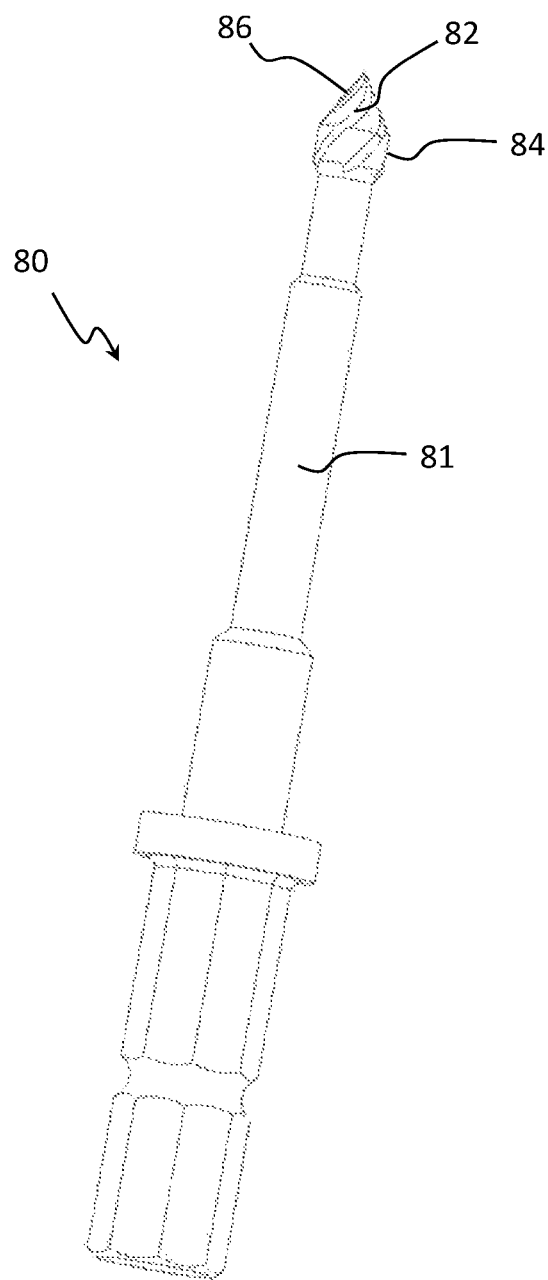
FIG. 7 is a perspective view of a cutting tool used in the manufacturing step of FIG. 5.
Figure 8:
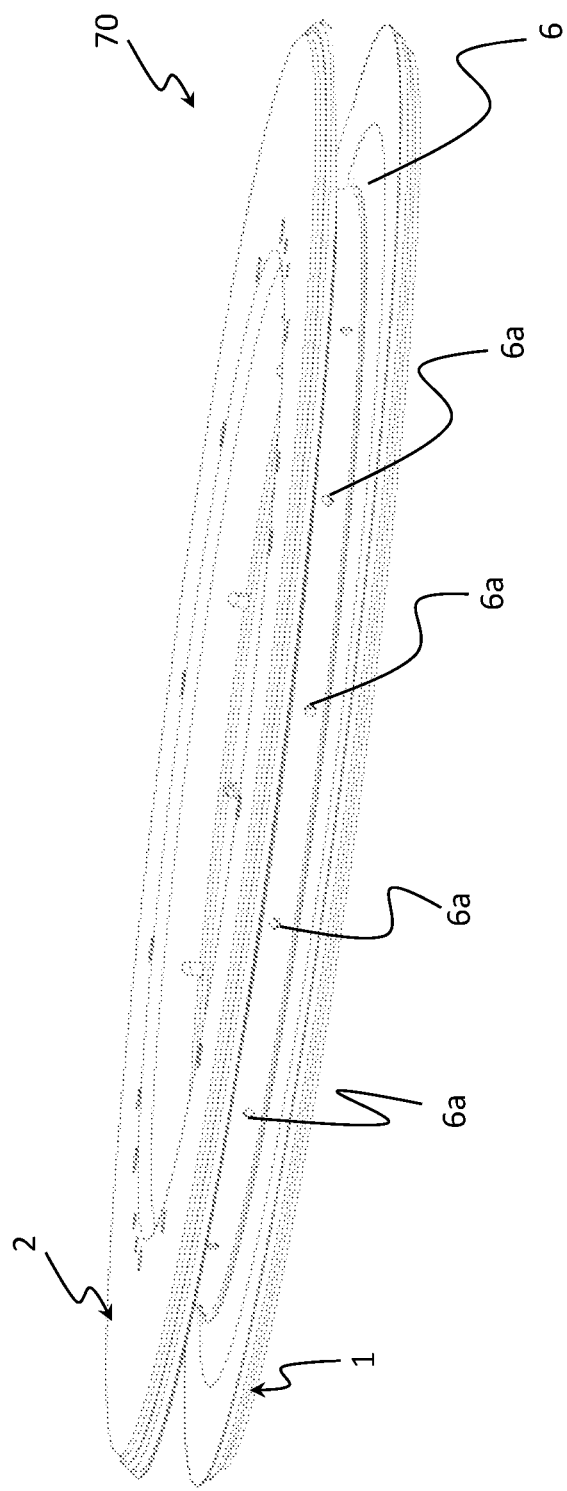
FIG. 8 schematically illustrates a second manufacturing step according to the process of the present invention, such a second step being subsequent to the one of FIG. 5.

The composite material 6 is perforated at the through holes 5 through a cutting tool 80, shown in FIG. 7.

The cutting tool 80 is a rotating tool, mounted on an angular screwdriver 90 (illustrated in FIGS. 5 and 6), or on a drill. The angular screwdriver 90 has the advantage of being able to be maneuvered easily in narrow spaces, like those inside the mold 70.

In the non-limiting example illustrated in FIG. 7, the cutting tool 80 comprises a cylindrical shank 81 having, at a free end thereof, a cylindrical cutting portion 84 and a conical cutting tip 86. Both the cylindrical cutting portion 84 and the conical cutting tip 86 have at least one cutting edge 82.

In the specific example illustrated here, there is more than one cutting edge 82 (for example four) and they extend seamlessly on the cylindrical cutting portion 84 and on the conical cutting tip 86.

Preferably, the conical cutting tip 86 is diamond-tipped.

The perforation of the composite material 6 through the cutting tool 80 produces in the composite material 6 a through hole 6a at each through hole 5 of the mold 70.

The diameter of the cylindrical cutting portion 84 of the cutting tool 80 is selected as a function of the diameter of the through hole 6a to be made, of the desired ratio between cut and continuous (uncut) structural fibers to be obtained at the through hole 6a, as well as from industrial evaluations (needs to not break the cutting tool 80 and processing times).

Preferably, the cylindrical cutting portion 84 has a diameter comprised between 20% and 100% of the diameter of the through holes 6a, more preferably between 20% and 70% of the diameter of the second through holes 6a. During perforation a part of structural fibers can displace, as it is not yet blocked by the cross-linked polymeric material.

For example, in order to make a through hole 6a of diameter equal to 5 mm, it is possible to use a cutting tool 80 with a cylindrical cutting portion 84 having a diameter equal to 3.5 mm.

Preferably, the cutting tool 80 is used at room temperature, i.e. before being used it is not heated, so as to avoid portions of sheared structural fiber remaining stuck onto the surface thereof, which would worsen the quality and the dimensional precision of the through holes 6a.

The perforation of the composite material 6 to make the through holes 6a initially comprises inserting the conical cutting tip 86 in the circumferential groove 72 and subsequently moving the cutting tool 80 along the circumferential groove 72 until each through hole 5 is reached.

Once a through hole 5 has been reached, the cutting tool 80 is inserted into it along a first direction F, starting from the radially inner portion 5b thereof. The substantially frusto-conical (or cylindrical) shape of the radially inner portion 5b makes easier and guides the insertion of the cutting tool 80.

Thereafter, the cutting tool 80 reaches the substantially cylindrical radially outer portion 5a of the through hole 5 and is pushed until the composite material 6 is reached and perforated, thus making the through hole 6a in the composite material 6. In the non-limiting example illustrated, the cutting tool 80 is set in rotation in the clockwise direction.

The cutting tool 80 is then removed from the through hole 5, moving it along a direction B opposite to the insertion direction F.

The conical tip 86 of the cutting tool 80 is thus moved at the circumferential groove 72 and run across it until the next through hole 5 is reached, where it carries out the perforation of the composite material 6 in the same way as described above.

Figure 9:
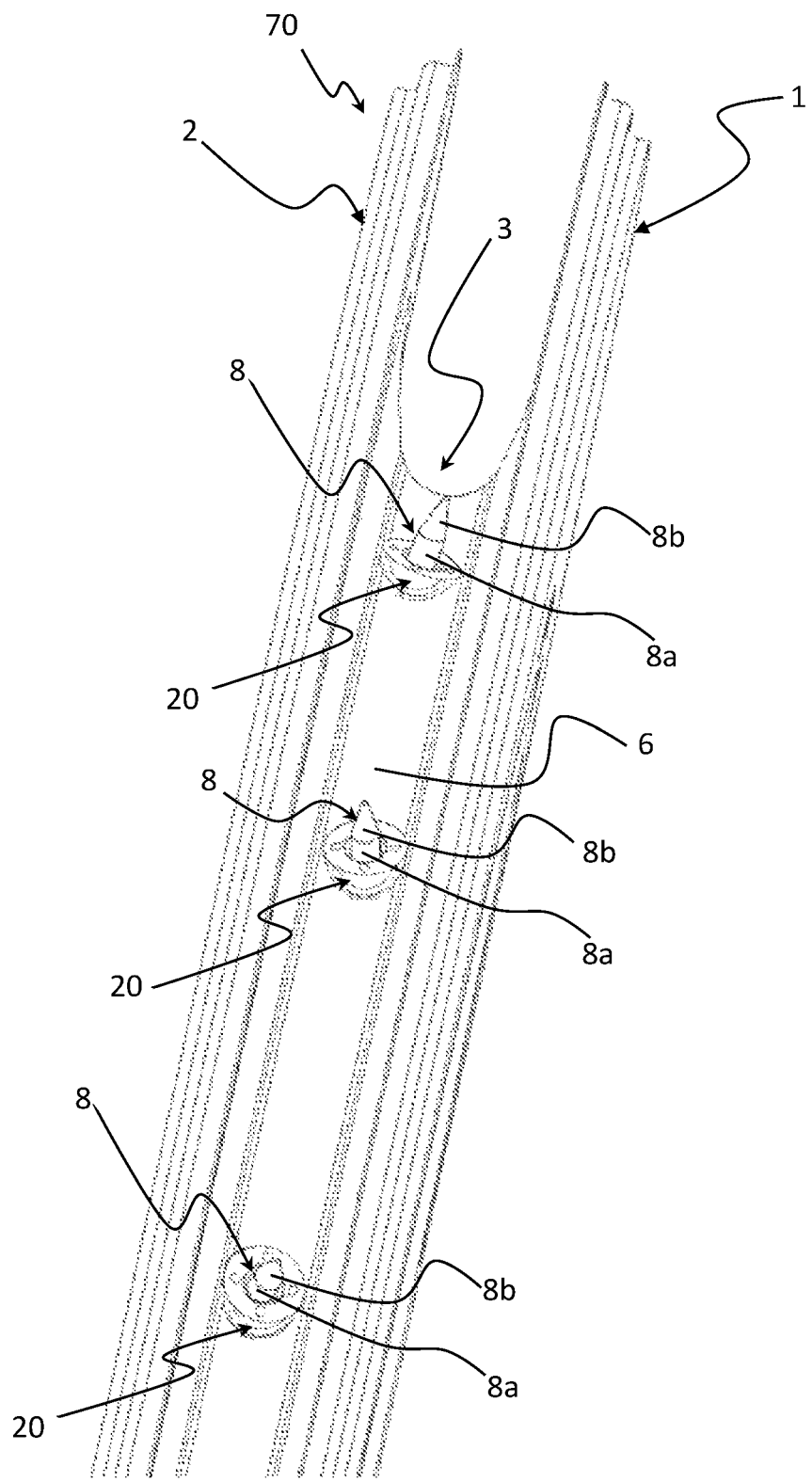
FIG. 9 illustrates a third manufacturing step according to the process of the present invention, which is subsequent to the one of FIG. 8; and, FIG. 10 illustrates a fourth manufacturing step according to the process of the present invention, which is subsequent to the one of FIG. 9.

After the cutting tool 80 is removed from the through hole 6a, the latter is fine-finished to size through a non cutting pointed tool 8, such as a pin, as illustrated in FIG. 9.

In the present description, the term "finish to size" is used to indicate a mechanical operation that causes the displacement of cut structural fibers 60a, 60b and of continuous structural fibers 60c until a desired size of the through hole 6a in the composite material 6 is reached. Such a through hole 6a defines, after the composite material 6 is molded, a nominal design size of the perforated spoke-attachment seat 58. In the case of preimpregnated structural fibers, the polymeric material 6 is also displaced by the non cutting pointed tool 8.

As shown in FIG. 9, a plurality of non cutting pointed tools 8 are preferably provided so as to be able to operate in series on a plurality of perforated seats 58.

Each non cutting pointed tool 8 comprises a cylindrical portion 8a and a conical (or frusto-conical) non cutting tip 8b.

The diameter of the cylindrical portion 8a corresponds substantially to the nominal diameter D of the perforated spoke-attachment seats 58 to be formed in the rim 50, or it is slightly greater than such a nominal diameter D.

The diameter of the cylindrical portion 8a is substantially equal to or slightly smaller than the diameter of the radially outer portion 5a of the through hole 5.

The diameter of the cylindrical portion 8a is comprised between 90% and 100% of the diameter of the through holes 6a, preferably between 95% and 100% of the diameter of the through holes 6a, even more preferably between 97% and 100% of the diameter of the through holes 6a, for example equal to 98% of the diameter of the through holes 6a.

Figure 10:
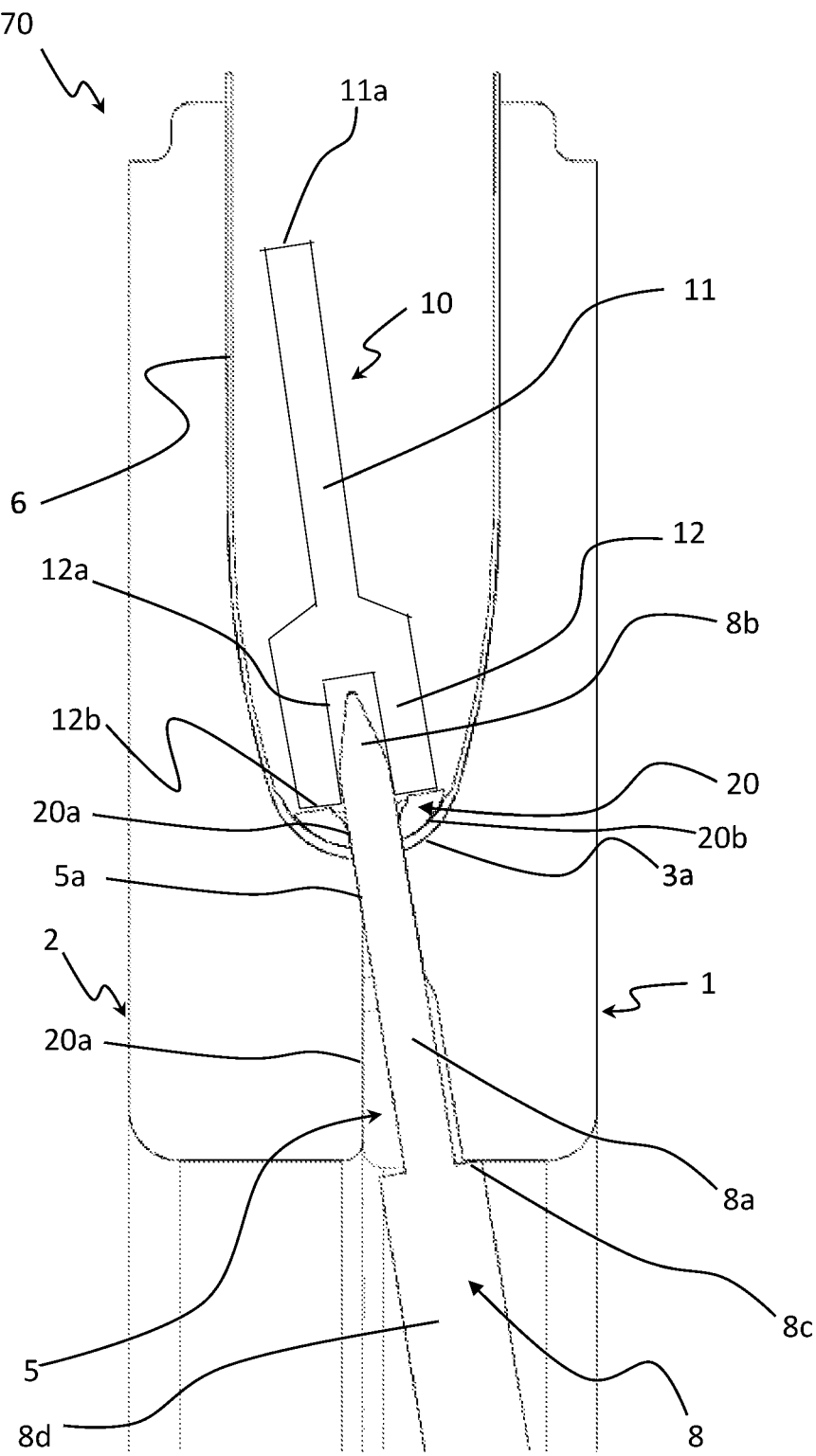

The non cutting pointed tool 8 is inserted in the through hole 6a along the first direction F from the through hole 5, thus from the radially inner side of the mold 70 (FIGS. 9 and 10). Such insertion is made easier by the substantially frusto-conical and flared inwardly shape of the radially inner portion 5b of the through hole 5.

The non cutting pointed tool 8 then reaches the radially outer portion 5a of the through hole 5 and is pushed until the non cutting pointed tool 8 reaches and passes the through hole 6a, thereby fine-finishing it to size. The insertion of the non cutting pointed tool 8 thus proceeds until the conical non cutting tip 8b and a part of the cylindrical portion 8a project in a radially outer direction with respect to the composite material 6.

As shown in FIG. 10, the non cutting pointed tool 8 can comprise an abutment shoulder 8c configured to abut on the radially inner surface 71 of the mold 70 at the through hole 5, so as to easily define the correct insertion depth of the non cutting pointed tool 8 in the mold 70. Such an abutment shoulder 8c is defined at an end of a grip portion 8d of the non cutting pointed tool 8, which is in a radially inner position with respect to the cylindrical portion 8a thereof.

The insertion of the non cutting pointed tool 8 in the through hole 6a of the composite material 6 causes a displacement of the continuous structural fibers 60c and of the cut structural fibers 60a, 60b, until a desired size of the through hole 6a is reached. Such a desired size defines, after the subsequent molding of the composite material 6, a nominal design size D of the perforated seat 58. Typically, the diameter of the through hole 6a after the fine-finishing to size made by the non cutting pointed tool 8 is greater than or equal to the diameter of the through hole 6a after the perforation made by the cutting tool 80, the latter depending on the diameter of the cylindrical cutting portion 84 of the cutting tool 80.

In the aforementioned insertion step of the non cutting pointed tool 8, the latter follows the inclination of the radially outer portion 5a of the through hole 5 in the inner elements 1, 2 of mold 70. The through hole 5 thus acts as a guide for the non cutting pointed tool 8.

Preferably, the non cutting pointed tool 8 is used after at least the conical non cutting tip 8b has been heated. In this case, at the conical non cutting tip 8b the viscosity of the polymeric material decreases, promoting the displacement of the continuous structural fibers 60a and of the cut structural fibers 60b, 60c.

Preferably, if the polymeric material of the composite material 6 is of the thermosetting type, the temperature of the pointed tool 8 is lower than the cross-linking temperature thereof. The temperature of the pointed tool 8 can however also be greater than the cross-linking temperature. In this case the pointed tool 8 is maintained in the through hole 6a of the composite material 6 for a reduced time, so as not to cause an increase in the temperature of the composite material 6 such as to reach the cross-linking temperature. The heating must also take place at a temperature such as to avoid the polymeric material dripping in the through hole 5. Merely as an example, the heating temperature can be 80°-100°.

The insertion of the non cutting pointed tool 8 in the composite material 6 ensures that some end portions of cut structural fibers 60b project from the through hole 6a towards the cavity 3 of the mold 70.

A subsequent compacting of the composite material 6 at each of the through holes 6a is thus carried out. Such compacting ensures that the aforementioned end portions of cut structural fibers 60b projecting with respect to the through hole 6a are folded towards the portions of continuous structural fibers 60c arranged around the perimeter circumference 59 of the perforated seat 58, preferably creating the aforementioned strands.

In the non-limiting example illustrated in the attached figures, before extracting the non cutting pointed tool 80 from the through hole 6a and carrying out the aforementioned compacting, a respective insert 20 is positioned at each through hole 6a (FIG. 10).

Such an insert 20 has a respective through hole 20a that is fitted onto the conical non cutting tip 8b, and onto the cylindrical portion 8a of each non cutting pointed tool 8 projecting with respect to the composite material 6, until it abuts on the composite material 6.

The inserts 20 are made of a material that has a good behavior as far as the fatigue resistance and the co-moldability with the composite material 6 is concerned. Thermoplastic or thermosetting polymeric materials, possibly reinforced by fibers, as well as metallic materials, are suitable. A particularly preferred material is the polyetherimide commercialized as Ultem 2400 by Sabic, Riyadh, Saudi Arabia.

The composite material 6 is then compacted at each of the through holes 6a. Such compacting provides for the composite material 6 to be pressed against the radially outer wall 3a of the mold 70 by acting with a pressing tool 10 on the insert 20 (FIG. 10).

The pressing tool 10 comprises a first end portion 11 having a top surface 11a configured to be hit with a hammer, and a second end portion 12 having a hollow cylindrical shape.

The cavity of the second end portion 12 has a substantially cylindrical wall 12a and is sized to be fitted onto the conical non cutting tip 8b of the non cutting pointed tool 8 and onto the part of the cylindrical portion 8a thereof which is in the cavity 3 of the mold 70 (FIG. 10). In particular, the second end portion 12 is fitted onto the free end portion of the non cutting pointed tool 8 until the free end surface 12b thereof abuts against the insert 20.

The top surface 11a of the pressing tool 10 is thus hammered. Due to such hammering, the radially inner surface 20b of the insert 20 presses on the portion of composite material 6 beneath, making the aforementioned compacting.

Subsequently, the non cutting pointed tools 8 are removed from the through holes 5, moving them along the direction B opposite to the insertion direction F. The inserts 20 remain associated with the perforated seats 58 due to the aforementioned compacting, to then be at least partially incorporated in the composite material 6 after the subsequent molding.

Possible end portions of cut structural fibers that, after the removal of the non cutting pointed tools 8 from the respective through holes 6a, project from the through hole 6a in a radially inner direction can then be removed with a fine-finishing post-processing.

The molding of the composite material 6 in the mold 70 therefore proceeds, obtaining the respective perforated spoke-attachment seat 58 at each of the second through holes 6a.

During the molding operation a further compacting of the polymeric material, as well as the cross-linking of the polymeric material in the case in which it is thermosetting, takes place, with consequent locking in position of the continuous structural fibers 60c and cut structural fibers 60a, 60b, as well as of the inserts 20.

The process described above, the essential features thereof being recited in the following claims, makes it possible to make, with high repeatability, rims having perforated seats 58 with a diameter even greater than 5 mm, for example comprised between 5.7 mm and 6.5 mm.

Of course, those skilled in the art, in order to satisfy specific and contingent requirements, can bring numerous changes and variants to the present invention, all of which are in any case within the scope of protection defined by the following claims. The following should therefore only be taken as an example.

Instead of using preimpregnated composite material, a material in dry fiber can be used during the initial steps of the process, so that in particular the perforation step can take place on only the material in dry fiber. The polymeric material is subsequently injected, preferably in several points, to incorporate the material in dry fiber, before the application of the temperature and pressure profile necessary for the hardening of the composite material.

Moreover, the process can comprise the step of temporarily sealing the perforated seats during the aforementioned molding step, for example with an auxiliary element analogous to the one described in EP 2422959. The temporary sealing of the perforated seats during molding can in any case also be omitted, possibly by providing for a cleaning step after molding.

The process of the invention can comprise the step of co-moulding an outer rim component, made of metallic or composite material, with the aforementioned part of rim made of composite material.

The process described above can also be applied only to some of the perforated spoke-attachment seats, the other spoke-attachment seats being made in the rim with a conventional technology.

The bicycle wheel rim made according to the invention adapts particularly well to tubeless wheels.

However, it should be understood that the invention applies, in the various aspects thereof, also to rims for wheels with air chamber and for wheels with tubular tyres (clincher).

What is claimed is:

1. A rim for a bicycle wheel, the rim comprising a wall made of composite material having a plurality of perforated spoke-attachment seats and unidirectional structural fibers which, in areas far from the perforated seats, extend along a longitudinal direction, wherein at least one of said plurality of perforated spoke-attachment seats is at least in part delimited by:
   at least one first area comprising end portions of a first plurality of cut structural fibers;
   at least one second area circumferentially spaced apart from said at least one first area and comprising both end portions of a second plurality of cut structural fibers having a longitudinal dimension greater than a longitudinal dimension of the structural fibers of said first plurality of cut structural fibers, and first portions of continuous structural fibers;
   wherein the at least one second area comprises an area of amassment of end portions of the second plurality of cut structural fibers and of first portions of continuous structural fibers, and,
   wherein in said area of amassment at least some of the end portions of the structural fibers of said second plurality of cut structural fibers are spread apart and are in a condition of mutual juxtaposition or of mutual interposition with respect to said first portions of continuous structural fibers.

2. The rim according to claim 1, wherein said at least one second area comprises at least one first zone in which both said end portions of said second plurality of cut structural fibers and said first portions of continuous structural fibers are provided and at least one second zone in which only second portions of said continuous structural fibers are provided.

3. The rim according to claim 1, wherein in said at least one second area only said end portions of said second plurality of cut structural fibers and said first portions of continuous structural fibers are provided.

4. The rim according to claim 1, wherein at least some of said end portions of said second plurality of cut structural fibers are at least partially arranged in a radially outer position with respect to said first portions of continuous structural fibers.

5. The rim according to claim 1, wherein at least some of said end portions of said second plurality of cut structural fibers are at least partially arranged in a radially inner position with respect to said first portions of continuous structural fibers.

6. The rim according to claim 1, wherein at least some of said end portions of said second plurality of cut structural fibers are grouped together to form respective strands of cut structural fibers.

7. The rim according to claim 1, wherein said at least one perforated seat is at least in part delimited by two of said first areas and by two of said second areas, wherein said two second areas are preferably arranged at first angular sectors that are opposite with respect to said at least one perforated seat and said two first areas are preferably arranged at second angular sectors that are opposite with respect to said at least one perforated seat.

8. The rim according to claim 7, wherein said two first areas are arranged along said longitudinal direction (L), and said two second areas are arranged along a second direction (T) that is inclined with respect to the longitudinal direction (L) by a first angle, the second direction (T) being preferably substantially perpendicular to the longitudinal direction (L).

9. The rim according to claim 8, wherein the longitudinal direction (L) is substantially parallel to a longitudinal direction of the continuous structural fibers and of the cut structural fibers in areas far from the perforated seats.

* * * * *